US009413774B1

(12) United States Patent
Liu et al.

(10) Patent No.: US 9,413,774 B1
(45) Date of Patent: Aug. 9, 2016

(54) DYNAMIC MALWARE ANALYSIS OF A URL USING A BROWSER EXECUTED IN AN INSTRUMENTED VIRTUAL MACHINE ENVIRONMENT

(71) Applicant: Palo Alto Networks, Inc., Santa Clara, CA (US)

(72) Inventors: Jiangxia Liu, Santa Clara, CA (US); Xin Ouyang, Santa Clara, CA (US); Bo Qu, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 14/525,027

(22) Filed: Oct. 27, 2014

(51) Int. Cl.
*H04L 29/06* (2006.01)
*G06F 9/455* (2006.01)
*G06F 21/55* (2013.01)
(Continued)

(52) U.S. Cl.
CPC ........ *H04L 63/1416* (2013.01); *G06F 9/45533* (2013.01); *G06F 21/50* (2013.01); *G06F 21/52* (2013.01); *G06F 21/55* (2013.01);
(Continued)

(58) Field of Classification Search
CPC ......... G06F 21/50; G06F 21/52; G06F 21/53; G06F 21/564; G06F 21/566; G06F 21/567; G06F 21/568; G06F 9/45533; G06F 21/55; G06F 21/552; H04L 63/14; H04L 63/1408; H04L 63/1416
See application file for complete search history.

(56) References Cited

U.S. PATENT DOCUMENTS 6,275,938 B1   8/2001   Bond et al.
7,779,472 B1   8/2010   Lou
(Continued)

FOREIGN PATENT DOCUMENTS

CA   2854182   5/2013
WO   2012092251   7/2012
(Continued)

OTHER PUBLICATIONS

You et al., Malware Obfuscation Techniques: A Brief Survey, 2010 International Conference on Broadband, Wireless Computing, Communication and Applications, IEEE 2010, pp. 297-300.
(Continued)

*Primary Examiner* — Kaveh Abrishamkar
*Assistant Examiner* — Ayoub Alata
(74) *Attorney, Agent, or Firm* — Van Pelt, Yi & James LLP

(57) ABSTRACT

Various techniques for performing malware analysis of a URL (e.g., a URL sample) using a browser executed in an instrumented virtual machine environment are disclosed. In some embodiments, a system for performing dynamic malware analysis of a URL using a browser executed in an instrumented virtual machine environment includes the instrumented virtual machine environment executed on a processor that receives a URL sample for dynamic malware analysis using the browser executed in the instrumented virtual machine environment; and a dynamic time allocator executed on the processor that dynamically determines a period of time allocated for performing the dynamic malware analysis of the URL sample using the browser executed in the instrumented virtual machine environment, in which the URL sample is rendered using the browser executed in the instrumented virtual machine environment and monitored using the instrumented virtual machine environment for the period of time allocated for performing the dynamic malware analysis of the URL sample.

20 Claims, 5 Drawing Sheets

(51) Int. Cl.
*G06F 21/56* (2013.01)
*G06F 21/52* (2013.01)
*G06F 21/50* (2013.01)

(52) U.S. Cl.
CPC ............ *G06F 21/552* (2013.01); *G06F 21/566* (2013.01); *H04L 63/14* (2013.01); *H04L 63/1408* (2013.01)

(56) References Cited

U.S. PATENT DOCUMENTS

| | | | |
|---|---|---|---|
| 8,051,478 B1* | 11/2011 | Rajan | ...................... G06F 21/51 726/22 |
| 8,370,938 B1 | 2/2013 | Daswani et al. | |
| 8,756,696 B1 | 6/2014 | Miller | |
| 8,789,178 B2 | 7/2014 | Kejriwal et al. | |
| 8,832,836 B2 | 9/2014 | Thomas et al. | |
| 2012/0266244 A1 | 10/2012 | Green et al. | |
| 2012/0304244 A1* | 11/2012 | Xie | ......................... G06F 21/00 726/1 |
| 2013/0117848 A1 | 5/2013 | Golshan et al. | |
| 2013/0160120 A1 | 6/2013 | Malaviya et al. | |
| 2015/0096022 A1* | 4/2015 | Vincent | ................ G06F 21/566 726/23 |

FOREIGN PATENT DOCUMENTS

| | | |
|---|---|---|
| WO | 2012092252 | 7/2012 |
| WO | 2013067505 | 5/2013 |

OTHER PUBLICATIONS

Egele et al., Defending Browsers Against Drive-By Downloads: Mitigating Heap-Spraying Code Injection Attacks, Detection of Intrusions and Malware, and Vulnerability Assessment Lecture Notes in Computer Science vol. 5587, 2009, pp. 88-106.

Polychronakis et al., Ghost Turns Zombie: Exploring the Life Cycle of Web-Based Malware, printed on Oct. 23, 2014.

Rajab et al., Trends in Circumventing Web-Malware Detection, Google Technical Report, Jul. 2011.

Baecher et al., The Nepenthes Platform: An Efficient Approach to Collect Malware, Recent Advances in Intrusion Detection Lecture Notes in Computer Science, vol. 4219, 2006, pp. 165-184.

* cited by examiner

DYNAMIC MALWARE ANALYSIS OF A URL USING A BROWSER EXECUTED IN AN INSTRUMENTED VIRTUAL MACHINE ENVIRONMENT

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
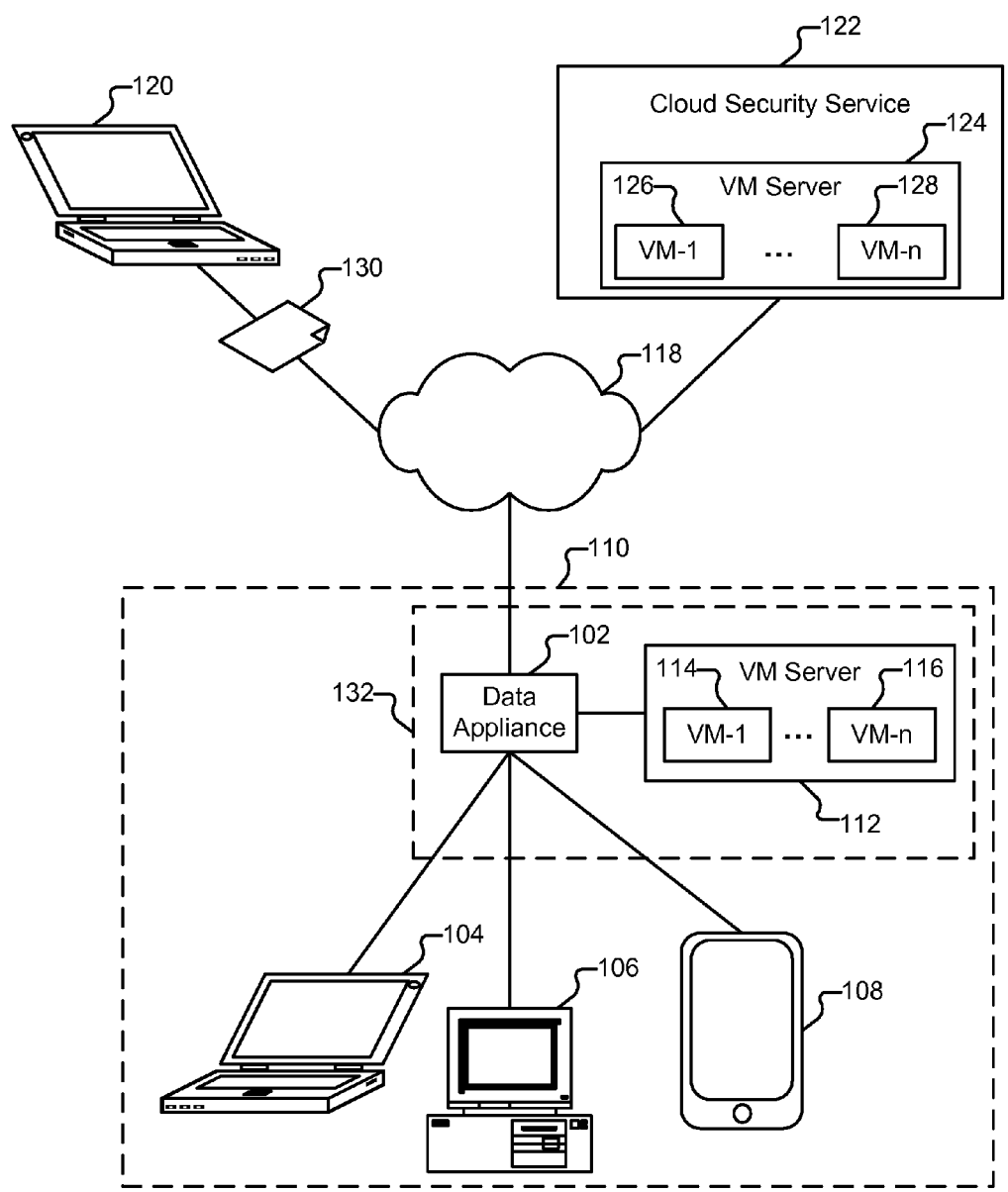
FIG. 1 is a functional diagram of an architecture for providing detection of malware by performing dynamic malware analysis using an instrumented virtual machine environment in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls)

For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Dynamic Analysis for Advanced Threats and Unknown Malware

A significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and/or unknown threats). For example, a new zero-day threat and/or an advanced threat, such as an Advanced Persistent Threat (APT) (e.g., various techniques using malware to exploit vulnerabilities in systems and often using an external command and control (C&C) for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system of a device (e.g., a client device, a server, an appliance, a networking device, a printer, and/or other types of computing devices).

In particular, modern attackers are increasingly using targeted and/or new unknown variants of malware to avoid detection by traditional security solutions. For example, advanced security threats (e.g., advanced cyber-attacks) are employing stealthy, persistent methods to evade traditional security measures. Skilled adversaries (e.g., hackers) demand that modern security teams re-evaluate their basic assumptions that traditional intrusion prevention systems, antivirus, and single-purpose sandbox appliances are up to the task of defeating advanced security threats, such as APTs.

To address this, new and improved techniques are needed to efficiently and effectively identify such new and evolving advanced threats. For example, by executing suspect files (e.g., malware samples) in a virtual environment (e.g., an instrumented virtual environment, which is sometimes also referred to as using a sandbox analysis of malware samples that can be instrumented with various user level and/or kernel level hooks for monitoring behaviors of programs executing and/or monitoring various network activities, which can be unknown threats) and observing their behavior, such malware can be quickly and accurately identified, even if the malware sample has not been previously analyzed and detected.

Once a malware sample is deemed malicious (e.g., a malware sample is deemed to be malware), protections can be automatically generated using, for example, a cloud security service (e.g., implementing a dynamic security analysis of malware samples in a scalable cloud-based, virtual environment to directly observe the behavior of potentially malicious malware and exploits) to be delivered to subscribers of the cloud security service (e.g., within minutes or hours of detection). For example, such techniques can also be used to forensically determine who/what was targeted, including the application used in the delivery, any Uniform Resource Locator addresses (URLs) that were part of the attack (e.g., URL signatures can be automatically generated), and/or other aspects (e.g., when an unknown threat is discovered, techniques disclosed herein can automatically generate protections to block the threat across the cyber kill-chain, sharing these updates with subscribers of the cloud security service within minutes or hours of detection, such that these quick updates can stop rapidly spreading malware, as well as identify and block the proliferation of potential future variants without any additional action or analysis).

As disclosed herein, the cloud security service identifies unknown malware, zero-day exploits, and/or Advanced Persistent Threats (APTs) by directly executing them in a scalable cloud-based, virtual sandbox environment (e.g., an instrumented virtual environment (also referred to herein as a virtual machine (VM) environment), which is provided by commercially available cloud security services, such as Wild-Fire™ offered by Palo Alto Networks, Inc., which provides for dynamic analysis to identify and block unknown threats, including APT prevention). In one embodiment, the cloud security service automatically creates and disseminates protections in near real-time to help security teams meet the challenge of advanced security threats. In an example implementation, the cloud security service extends the next-generation firewall platform that natively classifies all traffic across many different applications, and the cloud security service can apply a behavioral analysis regardless of ports or encryption, including full visibility into web traffic (e.g., HTTP traffic), email protocols (e.g., SMTP, IMAP, and POP protocols), FTP, SMB, and/or other protocols to facilitate detection and dissemination protections in near real-time to respond to such previously unknown malware and/or new advanced security threats.

Technical Challenges Exist for Efficiently and Accurately Performing Malware Analysis of URL Samples Detection of malware using an instrumented virtual environment can be costly in terms of required computing resources (e.g., including processor and memory usage and computing time) used to perform dynamic security analysis using such an instrumented virtual environment. For example, existing sandbox approaches to malware detection typically only allocate a default, fixed amount of processing time to perform malware analysis of a given malware sample, which can be inefficient and/or limit malware detection rates (e.g., as certain malware may require different periods of time to exhibit malware behaviors; in some cases, malware is designed to evade detection in a virtual environment by delaying the performance of malware behaviors and/or using other approaches as described below).

Thus, what are needed are new and improved techniques for detection of malware using an instrumented virtual machine environment. For example, various techniques described herein can more efficiently perform detection of malware using an instrumented virtual machine environment, such as by more efficiently using computing resources, including processor and memory usage and computing time, used to perform dynamic security analysis using such an instrumented virtual environment. In addition, these techniques described herein can also provide an enhanced detection rate of malware using an instrumented virtual machine environment that is performed more efficiently to more accurately detect new and/or unknown malware, such as new/unknown URL samples, as further discussed below.

For example, a new zero-day threat and/or other unknown malware that has not previously been identified (e.g., for which no signature yet exists) can exploit new or unresolved vulnerabilities in an application or operation system of a device (e.g., a client device, a server, an appliance, a networking device, a printer, and/or other types of computing devices). Such threats/malware can be delivered via resources (e.g., web pages) accessible via a network (e.g., the Internet, such as via the World Wide Web) through a browser accessing a Uniform Resource Locator (URL). A URL generally includes a reference, such as a network address, to a resource that can be retrieved using a browser (e.g., a web browser, such as Microsoft Internet Explorer®, Google Chrome®, and/or Apple Safari®), and in some cases, the resource includes executable content or links/URLs to other content that can include executable content (e.g., programs, such as scripts or other programs) that can be malware or facilitate delivery of malware. A cloud security service, such as described herein, can implement an instrumented virtual machine (VM) environment to execute a browser that can be monitored while rendering a given URL sample to perform a malware analysis of the URL sample in the instrumented VM environment using various techniques described herein.

However, a cloud security service can generally receive a large number of URL samples for processing to perform dynamic malware analysis of each of the URL samples (e.g., received from security/firewall appliances or other devices of customers/subscribers of the cloud security service), which presents new and challenging technical problems to be able to efficiently and accurately perform dynamic malware analysis of large numbers of URL samples using an instrumented VM environment. For instance, a processing time and resource usage for the instrumented VM environment can be efficiently allocated in order to scale to efficiently process such URL samples while also providing sufficient allocation to accurately perform such malware analysis for each of the URL samples, such as further described below.

As such, current approaches to implementing VM environments for providing dynamic malware detection and security analysis generally perform analysis of discrete events (e.g., downloading of potential malware—a malware sample, such as a URL sample) and any subsequent activity in a VM environment (e.g., sandbox environment) for a default, fixed amount of time for each given URL sample (e.g., in which a stand-alone sandbox is typically executing one or more VM instances, which can be implemented using a cloud solution and/or appliance-based solution). For example, such approaches typically only allow for a fixed malware analysis time for each given URL sample using the instrumented VM environment (e.g., one to five minutes of execution time using the VM instance executed in the instrumented VM environment). This approach often fails to provide sufficient time for certain URL samples, which may require a longer period of time for such dynamic malware analysis to detect whether malware is associated with the URL sample. Also, this approach can provide too much time for certain URL samples, which may require less time for such dynamic malware analysis to detect whether malware is associated with the URL sample. In addition, this approach fails to provide for a realistic environment, such as by not performing certain interactions with a web page that can trigger execution of executable content associated with certain URL samples. Also, this approach fails to handle various anti-VM/sandbox malware detection evasion approaches used by attackers in certain URL samples, such as by not performing behaviors until after a period of time and/or other approaches as further discussed below. For example, a more skilled hacker can attempt to evade certain sandbox malware detection techniques by delaying the execution of certain malware executable content and/or only triggering the execution of certain malware executable content if certain user activities/interactions are detected.

Thus, what are needed are new and improved virtual machine (VM) techniques for efficiently and accurately processing URL samples for dynamic malware analysis to determine whether a given URL sample is malware or is associated with malware.

Accordingly, various techniques for performing malware analysis of a URL (e.g., a URL sample) using a browser executed in an instrumented virtual machine environment are disclosed. For example, techniques described herein can be used to provide more effective malware analysis of URL samples using a browser executed in an instrumented VM environment. In addition, techniques described herein can be used to provide more efficient malware analysis of URL samples using a browser executed in an instrumented VM environment.

Various techniques for performing malware analysis of a URL (e.g., a URL sample) using a browser executed in an instrumented virtual machine environment are disclosed. In some embodiments, a system for performing dynamic malware analysis of a URL using a browser executed in an instrumented virtual machine environment includes the instrumented virtual machine environment executed on a processor that receives a URL sample for dynamic malware analysis using the browser executed in the instrumented virtual machine environment; and a dynamic time allocator executed on the processor that dynamically determines a period of time allocated for performing the dynamic malware analysis of the URL sample using the browser executed in the instrumented virtual machine environment, and the URL sample is rendered using the browser executed in the instrumented virtual machine environment and monitored using the instrumented virtual machine environment for the period of time allocated for performing the dynamic malware analysis of the URL sample. For example, the dynamic time allocator can extend or reduce the period of time allocated for malware analysis of the URL sample based on content (e.g., dynamic or other content, such as Java Script code) associated with the resource.

In one embodiment, the system for performing dynamic malware analysis of a URL using a browser executed in an instrumented virtual machine environment further includes a URL malware analysis engine that determines whether the URL sample is associated with malware based on analysis of the URL sample during the period of time allocated for performing the dynamic malware analysis of the URL sample using the browser executed in the instrumented virtual machine environment.

In one embodiment, the system for performing dynamic malware analysis of a URL using a browser executed in an instrumented virtual machine environment further includes a browser helper object (BHO) that is executed (e.g., loaded or installed as a plugin) by the browser prior to rendering the URL sample.

In one embodiment, the system for performing dynamic malware analysis of a URL using a browser executed in an instrumented virtual machine environment further includes a BHO that is executed by the browser prior to rendering the URL sample, and the BHO includes an event enumerator component that processes the URL sample to enumerate each of the events that can be performed by the rendered URL sample (e.g., Java Script events and/or other events, including meta events, such as a refresh event).

In one embodiment, the system for performing dynamic malware analysis of a URL using a browser executed in an instrumented virtual machine environment further includes a browser helper object (BHO) that is executed by the browser prior to rendering the URL sample, and the BHO includes a modify time-out delay component that modifies a SetTimeOut function in the Java Script code of the URL sample to be a shorter delay, such as to be only a one second delay or some other value. In one embodiment, a SetInterval function in the Java Script code of the URL sample can be similarly hooked and modified to be a shorter delay, such as to be only a one second delay or some other value.

In one embodiment, the system for performing dynamic malware analysis of a URL using a browser executed in an instrumented virtual machine environment further includes a browser helper object (BHO) that is executed by the browser prior to rendering the URL sample, and the BHO includes an event message hooks component that generates message hooks for one or more events (e.g., an onload finish event can generate a message hook that can be used by the dynamic time allocator to determine whether to terminate the dynamic malware analysis of the URL sample, based on the onload timer and/or other parallel timers as further described below with respect to various embodiments and use case scenarios).

In one embodiment, the system for performing dynamic malware analysis of a URL using a browser executed in an instrumented virtual machine environment further includes a browser helper object (BHO) that is executed by the browser prior to rendering the URL sample, and the BHO includes a modify refresh delay that modifies a refresh function in the Java Script code of the URL sample to be a shorter delay, such as to be only a one second delay or some other value.

In one embodiment, the system for performing dynamic malware analysis of a URL using a browser executed in an instrumented virtual machine environment further includes a browser helper object (BHO) that is executed by the browser prior to rendering the URL sample, and the BHO includes a user interface (UI) event triggers component that calls (e.g., directly calls) a function(s) associated with a UI event in the Java Script code of the URL (e.g., OnClick, OnMouseMove, OnKeyDown, OnKeyUp, and/or various other UI events). In some cases, the UI event trigger component can simulate the UI event to cause the browser to call the function associated with that UI event.

In one embodiment, the BHO can include one or more, or all, of the above-described components to facilitate an enhanced and efficient dynamic malware detection using the dynamic time allocator as further described below with respect to various embodiments and use case scenarios.

In one embodiment, the instrumented virtual machine environment is executed by a cloud security service, the instrumented virtual machine environment executed on the processor that receives the URL sample for malware analysis further includes receiving the URL sample at the cloud security service from a security device, and the URL sample is rendered using the browser executed in the instrumented virtual machine environment and monitored using the instrumented virtual machine environment for at least the period of time allocated for malware analysis of the URL sample or until malicious behavior is detected.

In one embodiment, dynamic malware analysis of a URL using a browser executed in an instrumented virtual machine environment further includes receiving the URL sample at a cloud security service from a security device.

In one embodiment, dynamic malware analysis of a URL sample using a browser executed in an instrumented virtual machine environment further includes capturing network traffic while monitoring the instrumented virtual machine environment during the period of time allocated for performing the dynamic malware analysis of the URL sample using the browser executed in the instrumented virtual machine environment. In one embodiment, the instrumented virtual machine environment is configured to include at least one kernel hook and/or at least one user level hook.

Accordingly, various techniques for dynamic malware analysis of a URL sample using a browser executed in an instrumented virtual machine environment are disclosed. For example, using such techniques can facilitate an efficient and enhanced detection of malware associated with URL samples using an instrumented virtual machine environment. As will be apparent to one skilled in the art in view of the various techniques and embodiments described herein, while the various techniques described herein for performing an efficient and accurate dynamic malware analysis of a URL using a browser executed in an instrumented virtual machine environment are described with respect to virtual environments using a security service (e.g., a cloud security service), such techniques can similarly be applied to various other security environments, including, for example, performed in part or completely using security devices such as appliances, gateways, servers, and/or other security platforms capable of implementing various virtual environment techniques disclosed herein.

Overview of an Architecture for Performing a Dynamic Malware Analysis of URL Samples Using an Instrumented Virtual Machine Environment FIG. 1 is a functional diagram of an architecture for providing detection of malware by performing dynamic malware analysis using an instrumented virtual machine environment in accordance with some embodiments. For example, such an environment can detect and prevent malware from causing harm (e.g., malicious software can include any executable program, such as active content, executable code, and scripts, that can interfere with operation of a computing device or computer network, attempt unauthorized access of data or components of a computing device, and/or perform various other malicious, unauthorized, and/or undesirable activities). In particular, a variety of attempts by a malicious/unauthorized individual (e.g., a hacker) to propagate malware (e.g., malware 130) via system 120 are described, as are techniques for thwarting that propagation or execution of such malware in protected network computing environments, such as for protecting computing devices within an enterprise network 110.

In the example shown in FIG. 1, client devices 104, 106, and 108 are a laptop computer, a desktop computer, and a tablet (respectively) present in an enterprise network 110. Data appliance 102 is configured to enforce policies regarding communications between clients, such as clients 104 and 106, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, website downloads (e.g., URLs), files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

As will be described in more detail below, appliance 102 can be configured to work in cooperation with one or more virtual machine servers (112, 124) to perform malware analysis/prevention, including various techniques for performing dynamic malware analysis of Uniform Resource Locator (URL) samples using a browser executed in an instrumented virtual machine environment as disclosed herein. As one example, data appliance 102 can be configured to provide a copy of malware 130 (e.g., a malware sample, such as a URL sample, which can include or link to potentially malicious content) to one or more of the virtual machine servers for real-time analysis (e.g., dynamic analysis using an instrumented VM environment). As another example, a cloud security service 122 can provide a list of signatures of known-malicious URLs to appliance 102 as part of a subscription. Those signatures can be generated by service 122 in conjunction with the techniques described herein. For example, if service 122 identifies a new malware associated with the malware sample (e.g., URL sample) received from a data appliance (e.g., data appliance 102 or another data appliance), such as using various techniques for performing dynamic malware analysis of URL samples using a browser executed in an instrumented virtual machine environment as disclosed herein, cloud security service 122 can automatically generate a new signature for the newly identified malware and send the new signature to various subscribers. In this example, data appliance 102 and various other data appliances can receive subscription-based signature updates, such as for malware detected in URL samples that can be used to generate new URL signatures (e.g., malware URLs), that can then be applied by the data appliance(s) to block and/or perform other actions for network traffic associated with any such malware URLs based on a policy, such as a firewall policy.

An example of a virtual machine server is a physical machine comprising commercially available server-class hardware (e.g., a multi-core processor such as a dual 6-core Intel® processor with Hyper-Threading, 4 or more Gigabytes of RAM such as a 128 GB RAM, a system disk such as a 120 GB SSD, and one or more Gigabit network interface adapters) that executes commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacity/components). The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for dynamic malware analysis. In other embodiments, data appliance 102 is configured to use the services of both servers (and/or additional servers not shown). Thus, in some implementations, the cloud security service can be delivered either as a public cloud or as a private cloud (e.g., deployed locally on an enterprise network using a locally deployed data appliance or server).

Figure 3:
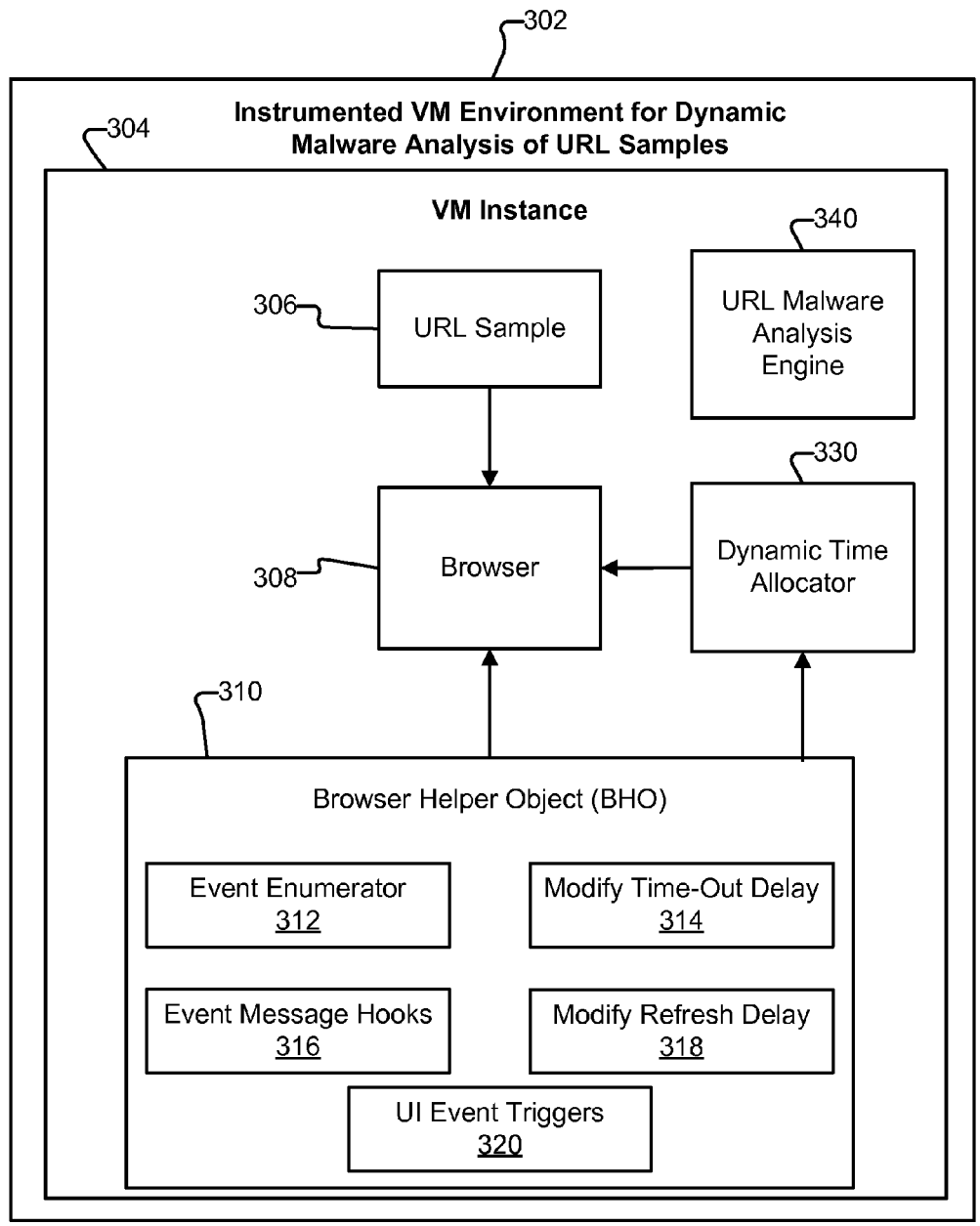
FIG. 3 is a functional diagram of an instrumented virtual machine environment for performing dynamic malware analysis in accordance with some embodiments.
Figure 4:
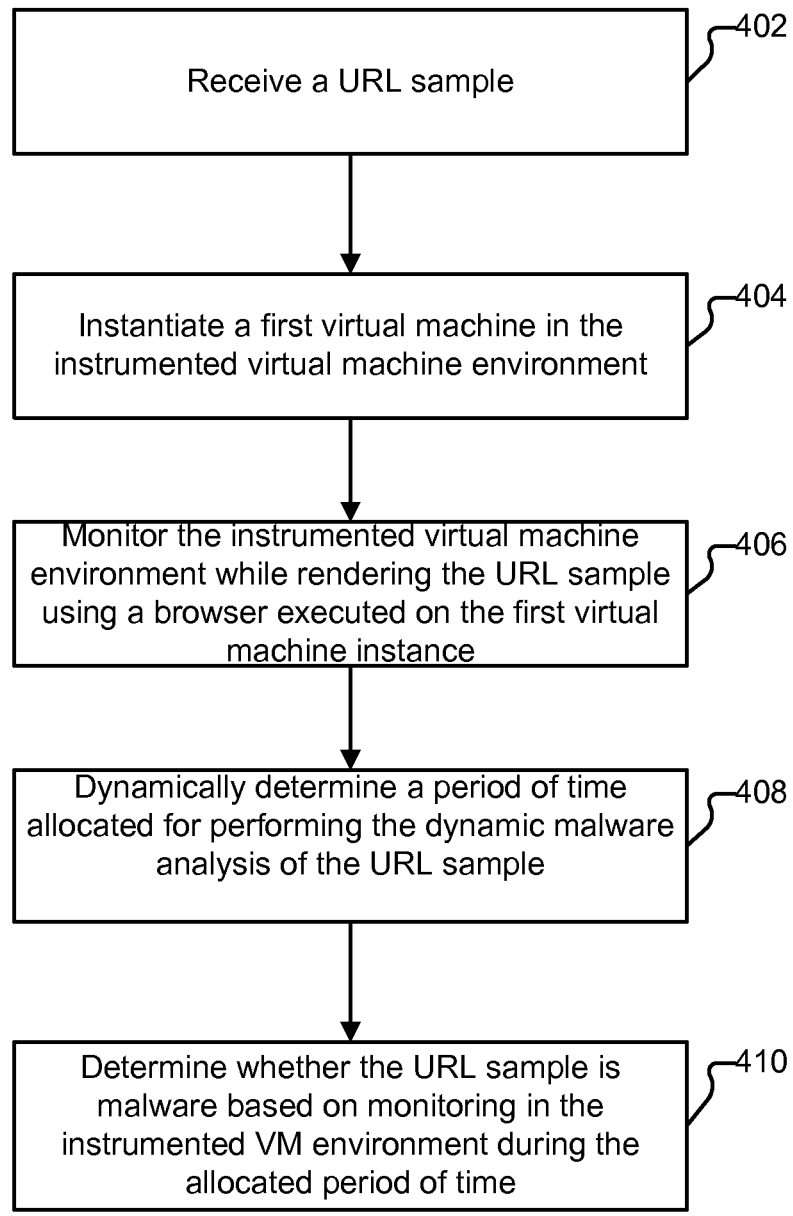
FIG. 4 is a flow diagram of a process for performing dynamic malware analysis of a URL using a browser executed in an instrumented virtual machine environment in accordance with some embodiments.
Figure 5:
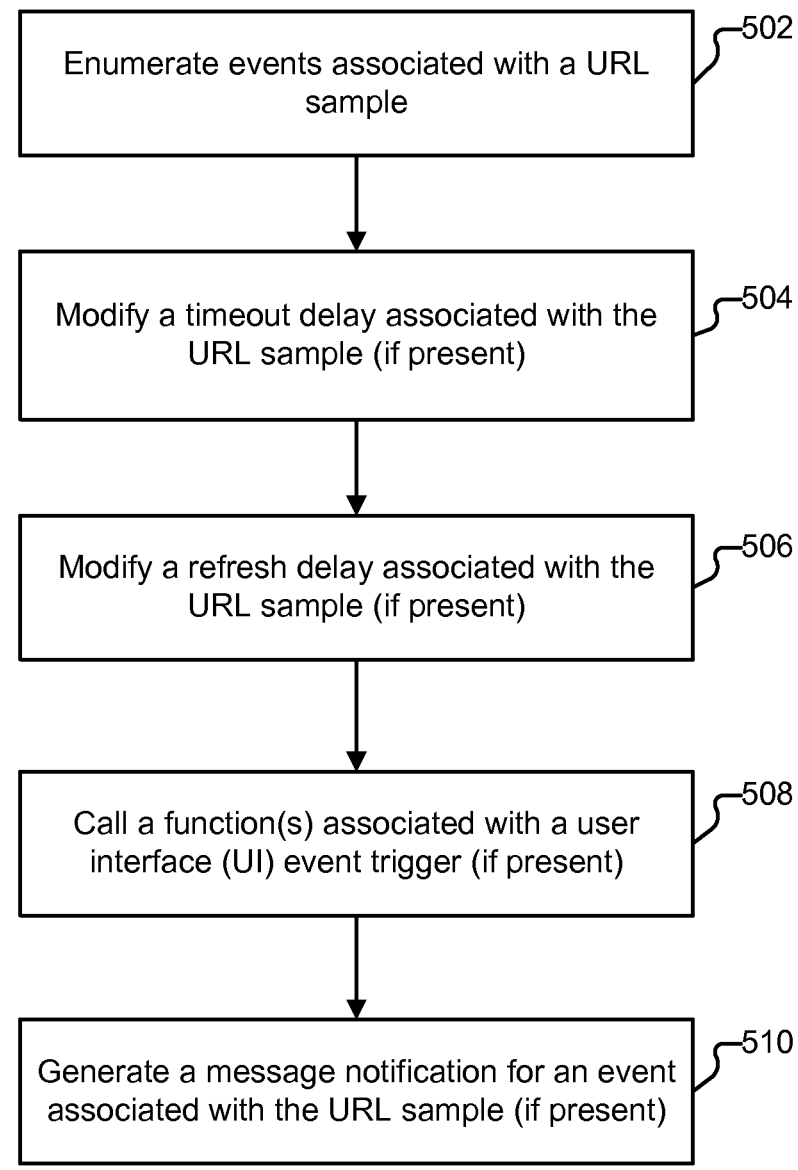
FIG. 5 is another flow diagram of a process for performing dynamic malware analysis of a URL using a browser executed in an instrumented virtual machine environment in accordance with some embodiments.

In some embodiments, the virtual machine server 124 is configured to implement various emulation-based techniques for performing dynamic malware analysis of a URL (e.g., URL samples) using a browser executed in an instrumented virtual machine environment as described herein with respect to various embodiments (e.g., implemented using instrumented VM environments 126 and 128, which can be executed by cloud security service 122 and/or malware analysis system 132, such as described below with respect to FIGS. 3 through 5, and with respect to various other embodiments disclosed herein). For example, the virtual machine server 124 can provide an instrumented virtual machine environment capable of performing the various techniques as described herein. These instrumented virtual machine (VM) environments 126 and 128 can include, for example, various user level hooks and/or kernel level hooks in the emulated execution environment (e.g., using various user level and/or kernel level hooks for monitoring behaviors of programs executing, such as a browser program, and/or monitoring various network activities) to facilitate the monitoring of various program behaviors (e.g., active/executable content included in a resource accessible via a URL, such as Java Script code that is embedded in a web page of the URL or linked to from the URL) during execution in the virtual environment (e.g., instrumented VM environments, such as described above) and to log such monitored program behaviors for analysis based on the various techniques described herein with respect to various embodiments. Also, in some cases, multiple instances of a malware sample (e.g., URL sample) can be performed using multiple VM environments to perform various tests and/or execute using different execution environments (e.g., different versions of an operating system (OS) environment, different versions of an application, for example, different versions of a browser such as Microsoft Internet Explorer® 9, Microsoft Internet Explorer® 10, Microsoft Internet Explorer® 11, etc.).

Figure 2:
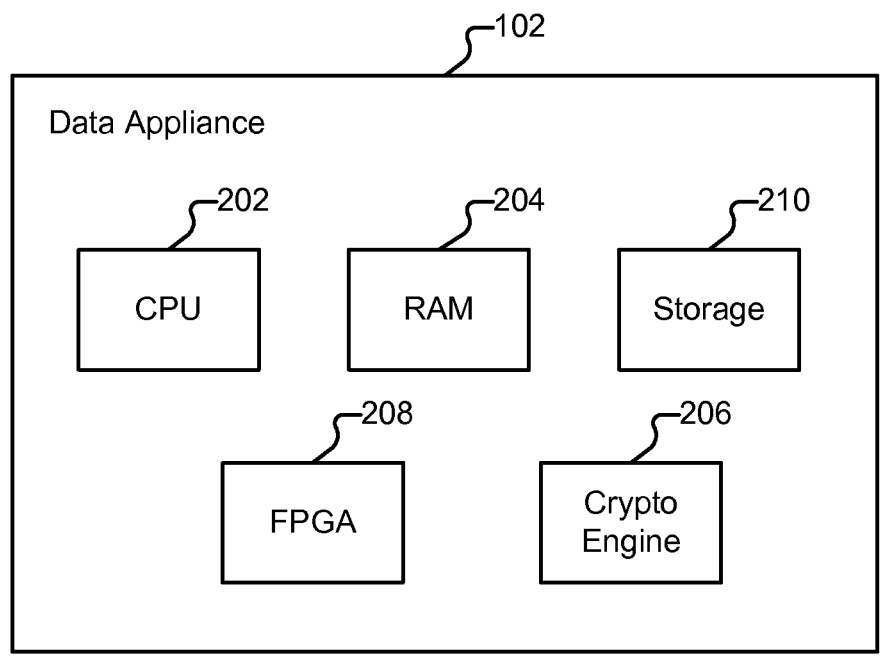
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy (e.g., a firewall policy and/or other policies) and other configuration information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Applying Instrumented Virtual Machines to Analyze URL Samples

An instrumented virtual machine (VM) can be used to perform behavior profiling (e.g., in a VM sandbox environment) using various heuristic-based analysis techniques that can be performed during execution of the program in the instrumented VM environment (e.g., in some cases, in real-time during execution of the program in the instrumented VM environment), such as during a file transfer (e.g., during an active file/attachment download, such as downloading and rendering a web page based on a URL sample) and/or on files previously collected (e.g., a collection of files submitted for batch analysis). Documents, executables, and other forms of potentially malicious content (e.g., to be evaluated) are referred to herein as "malware samples" or just "samples." URL samples generally refer to candidate malware samples that include a URL address and can generally be rendered using a browser (e.g., a web browser, such as Microsoft Internet Explorer® and/or other web browsers).

As one example, suppose a user of client 104 attempts to access a web page at a particular URL address using a web browser executed on client 104 by sending a request (e.g., an HTTP request) for the URL. The request for the URL is received by data appliance 102, which determines whether to filter the URL (e.g., allow, block, and/or perform other actions based on a policy and/or URL signatures) or to send the URL as a URL sample to a virtual machine server, such as virtual machine server 112 (or 124), for further analysis (e.g., dynamic malware analysis of the URL sample, based on a policy).

Virtual machine server 112 (or 124) is configured to execute a browser that can be used to request and render the URL in one or more virtual machines, such as virtual machines 114 and 116 (e.g., instantiated virtual machines in the instrumented virtual machine environment). The virtual machines may all execute the same operating system (e.g., Microsoft Windows Version 7, Version 8, Version 10, and/or other versions of the Microsoft operating system) or may execute different operating systems or versions thereof (e.g., with VM 116 emulating an Android operating system or some other operating system). Observed behaviors resulting from executing a browser and rendering the URL sample (e.g., to analyze various behaviors while rendering the URL sample using the browser in the instrumented VM environment) are logged and analyzed for indications that the URL is potentially malicious or malicious. For example, if attempts to retrieve or link to a known malware URL is detected, then the URL sample can be determined to be malicious. As another example, if certain behaviors are detected, then the URL sample can be determined to be malicious based on various heuristic techniques.

As discussed above, instantiating virtual machine instances for performing analysis of a given URL sample can be expensive from a computing resources perspective and can also be inefficient from a compute time perspective (e.g., due to the time required to launch an instance of a VM with desired resources as well as due to computing resource usage for such dynamic malware analysis including CPU and memory requirements for executing such VMs on an appliance/server). Thus, to improve performance of malware detection using an instrumented virtual machine environment, in some embodiments, various techniques are disclosed for performing dynamic malware analysis of a URL using a browser executed in an instrumented virtual machine environment (e.g., virtual machines 114 and/or 116, or virtual machines 126 and/or 128), as further described below.

In some embodiments, such VM-based analysis techniques are performed by the VM server (e.g., VM server 112 or 124). In other embodiments, such VM-based analysis techniques are performed at least in part by appliance 102 (e.g., or in some cases, such VM-based analysis techniques can be performed completely by the appliance 102). The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable.

If the URL sample (e.g., embedded URLs, active/executable or other content associated with the resource accessible via the URL of the URL sample) is determined to be malicious, appliance 102 can automatically block the URL request/web page download based on the analysis result. Further, in some embodiments, a signature can be generated and distributed (e.g., to appliance 102 and/or other data appliances) to automatically block future URL requests determined to be malicious (e.g., to block known malware URLs).

Techniques for Providing an Efficient and Enhanced Analysis of URL Samples Using an Instrumented Virtual Machine Environment As discussed above, to efficiently and effectively determine that a URL sample is malicious using an instrumented VM environment can be time consuming (e.g., requiring one to five minutes or longer in a VM instance executing in the instrumented VM environment, depending on the hardware/software embodiment and the URL sample). As also discussed above, existing approaches typically allocate a default, fixed period of time for malware analysis of each URL sample. For example, such approaches may allocate one minute (e.g., or some other default, fixed period of time) for malware analysis of each URL sample regardless of content for a given URL. As a result, such approaches waste computing resources and also waste the time of the instrumented VM environment to perform such analysis on URL samples that would require less time. Also, such approaches can fail to allocate sufficient time to detect malware associated with URL samples that are more complicated (e.g., in which certain malware content, such as malware Java Script active content in a web page or other suspicious or malicious content/actions, would not be detected within the default, fixed one minute period of time for performing malware analysis on the web page in the instrumented VM environment). As such, existing approaches are inefficient as such waste time for URL samples that actually require less than the fixed amount of time. Moreover, existing approaches are ineffective as such may not allow sufficient time for a given (e.g., more complicated) URL sample to perform malware analysis to detect malware associated with the URL.

In addition, a cloud security service can receive a significant number of URL samples per day for malware analysis (e.g., thousands to millions of URL samples per day). Moreover, given that URL samples can often be associated with resources (e.g., web pages or other resources) that can include active/executable content (e.g., Java Script or other active/executable content) that can display and dynamically generate content for display/execution during rendering by a browser, this can also create technical challenges for efficiently and effectively performing malware analysis of such URL samples using an instrumented VM environment. For example, such active/executable content can make it difficult to determine when the rendering of the URL (e.g., HTML web page) is completed (e.g., when to terminate the time allocated for malware analysis of the URL sample using the instrumented VM environment, such that computing resources of the instrumented VM environment can be used to perform malware analysis of another URL sample).

Accordingly, various techniques for performing dynamic malware analysis of a URL (e.g., a URL sample) using a browser executed in an instrumented VM environment are disclosed. For example, techniques described herein can be used to provide an enhanced dynamic malware analysis (e.g., more effective malware analysis) of URL samples using a browser executed in an instrumented VM environment. In addition, techniques described herein can be used to provide more efficient dynamic malware analysis of URL samples using a browser executed in an instrumented VM environment.

In one embodiment, dynamic malware analysis of a URL (e.g., a URL sample) using a browser executed in an instrumented VM environment is enhanced by determining a sufficient and/or more accurate period of time to allocate for dynamic malware analysis of the URL in the instrumented VM environment. In an example implementation, various system (e.g., operating system) and browser events can be detected (e.g., intercepted) in the instrumented VM environment that can facilitate various techniques as further described below. For example, various functions and/or events can be detected (e.g., registered for notifications using message hooks) in the instrumented VM environment. Java Script and/or browser related events can be enumerated on Java Script HTML Document Object Model (DOM) nodes (e.g., by accessing an unknown structure in system memory). Based on the events associated with a given URL sample, a time can be dynamically determined for how long to allocate to the dynamic malware analysis of the URL sample in the instrumented VM environment. As another example, an event can be intercepted (e.g., registered for notifications using message hooks), such as an onload event, which can facilitate a notification upon a completion of the onload event. Using these example approaches and various other approaches further described below, the content (e.g., HTML source code, Java Script code, and/or other content, including dynamic content) of a URL sample (e.g., web page) can be identified and recorded.

In one embodiment, a period of time allocated for analysis of a URL sample is dynamically determined, such that more time or less time can be allocated based on characteristics associated with the URL sample. These techniques can reduce the amount of time used for performing dynamic malware analysis of URLs in the instrumented VM environment, which therefore facilitates a more efficient using of computing resources of the instrumented VM environment for performing efficient dynamic malware analysis. Also, these techniques can facilitate detection of malware URLs that would otherwise evade detection using existing approaches to malware analysis thereby providing an enhanced dynamic malware detection of URL samples.

The disclosed techniques for providing an efficient and enhanced analysis of URL samples using an instrumented virtual machine (VM) environment can be implemented using the example instrumented VM environment for performing dynamic malware analysis of URL samples as shown in FIG. 3 as further described below.

FIG. 3 is a functional diagram of an instrumented virtual machine environment for performing dynamic malware analysis in accordance with some embodiments. As shown, an instrumented VM environment for dynamic malware analysis of URL samples 302 includes one or more VM instances, such as a VM instance 304. In various embodiments, instrumented VM environment 302 is executed on VM server 112 of malware analysis system 132 and/or on VM server 124 of cloud security service 122. As similarly described above with respect to FIG. 1, one or more URL samples can be provided to the instrumented VM environment for dynamic malware analysis of URL samples. In this example, a URL sample 306 is provided to a browser 308 (e.g., Microsoft Internet Explorer® or another web browser) executed in VM instance 304. A browser helper object (BHO) 310 is loaded by browser 308 before the URL sample is processed (e.g., retrieved and rendered) by browser 308. In an example implementation, BHO 310 is a dynamically loaded library (DLL) module that is implemented as a standard plugin module for the Microsoft Internet Explorer Browser® to perform added functionality. In this example, BHO 310 includes components for performing various functions as further described below.

In one embodiment, BHO 310 includes an event enumerator component 312. For example, event enumerator 312 can process the URL sample to enumerate each of the events (e.g., using Java Script HTML Document Object Model (DOM) nodes) that can be performed by the rendered URL sample (e.g., Java Script events and/or other events).

In one embodiment, BHO 310 also includes a modify time-out delay component 314. For example, attackers can use a SetTimeOut function to attempt to delay execution of content (e.g., Java Script code or other content) of a web page to avoid detection in a typical VM analysis environment (e.g., by having such execution delayed until some period of time that is longer than a typical time period allocated for malware analysis in the VM analysis environment). As such, modify time-out delay 314 can modify a SetTimeOut function in Java Script code of the URL sample to be a shorter delay, such as to be only a one second delay or some other value.

In one embodiment, BHO 310 also includes an event message hooks component 316. For example, event message hooks 316 can hook various events in Java Script code of the URL sample to generate a message when a particular event is completed (e.g., register such events for message notification, for example, an onload event can be registered such that a notification message is generated when the onload event is completed).

In one embodiment, BHO 310 also includes a modify refresh delay component 318. For example, attackers can use a refresh event/function to attempt to delay a refresh of a web page to avoid detection in a typical VM analysis environment (e.g., by having the refresh delayed until some period of time that is longer than a typical time period allocated for malware analysis in the VM analysis environment). As such, modify refresh delay 318 can modify a refresh associated with the URL sample to be a shorter delay, such as to be only a one second delay or some other value.

In one embodiment, BHO 310 also includes a UI event triggers component 320. For example, attackers can use UI event triggers to attempt to avoid execution of content (e.g., Java Script code or other content) of a web page if and until one or more UI event triggers are received to avoid detection in a typical VM analysis environment (e.g., by having the execution delayed if and until one or more UI event triggers are received, which would not be received in a typical VM analysis environment as there is no actual user interaction in such an emulated VM environment). As such, UI event triggers 320 can automatically generate such UI event triggers to trigger execution of all content (e.g., triggering execution of all of the functions in the Java Script code by directly calling such functions associated with such UI events and/or simulating such UI events so that the browser calls such functions) of the web page.

Each of these BHO components are described in further detail below with respect to various use case scenarios. As also shown in FIG. 3, a dynamic time allocator component is also provided. For example, the dynamic time allocator can dynamically select a period of time allocated for dynamic malware analysis of a given URL sample based on content of the URL sample as further described below with respect to various use case scenarios. During the allocated period of time for dynamic malware analysis, URL malware analysis engine 340 performs various malware analysis techniques to determine whether the URL sample is associated with malware. For example, URL malware analysis engine 340 can perform various heuristic and/or other malware detection techniques, based on various kernel-level and/or user-level hooks to monitor behaviors of the browser during execution/rendering of the URL sample, such as described herein and as well known by those of ordinary skill in the art.

In an example implementation, event enumerator 312 is executed to enumerate the Java Script and/or browser related events associated with a URL sample. For example, the events can be enumerated on Java Script HTML Document Object Model (DOM) nodes (e.g., by accessing a structure in system memory).

In an example implementation, modify time-out delay component 314 is implemented by modifying (e.g., at run-time) the JavaScript SetTimeOut function to reduce the parameter setting for that time for sleep/delay (e.g., to replace the SetTimeOut function parameter from, for example, five minutes of sleep/delay to one second to speed up operation). As discussed above, attackers can attempt to include such a timeout function in Java Script code as a mechanism to avoid detection in typical VM emulation techniques, by having the malware code not execute until some period of time that exceeds a typical amount of time allocated to a dynamic malware analysis in a VM environment (e.g., using such as a sleep function, to delay execution of certain code by setting the timer to delay malware code execution to not execute until after expiration of, for example, five minutes, assuming that a typical maximum time period allocated for such dynamic malware analysis in a VM environment would not be longer than five minutes).

In one embodiment, a JavaScript DLL (e.g., BHO 310) is loaded by browser 308 (e.g., Microsoft Internet Explorer®) executed in VM instance 304 before processing content associated with sample URL 306 (e.g., prior to retrieving and rendering HTML and executing Java Script code associated with the sample URL). For example, the JavaScript DLL can be added as a browser helper object (BHO) as described above. The BHO is loaded by the Internet Explorer browser such that the Java Script code included in the BHO can be loaded and executed prior to processing content associated with the URL sample (e.g., which can include HTML, Java Script code, other embedded URL(s), and/or other content).

For example, a SetTimeOut(Func(A), 300000) can be functionally converted to SetTimeOut(Func(A), 1000) at run-time to reduce the delay for performing this Java Script function, which is Func(A) in this example, from five minutes to only one second, as shown in the below example.

SetTimeOut (Func(A), 300000); //e.g., set time-out was to be 5 minutes //
   Window.SetTimeOut=FuncB
   Func FuncB(Func_argument, time_out_value)
   {
     SetTimeOut (Func_argument, 1000); //e.g., set time-out to now be only 1 second//
   }

Below is example pseudo code for implementing Modify Time-Out Delay component 314 to automatically change the parameter for the delay of a SetTimeOut function in the Java Script code of a URL sample.

OldFunc=window.SetTimeOut; //save the entry point of function
   window.SetTimeOut=function(a,b) {OldFunc(a,1000)};
//reduce delay to one second By reducing the SetTimeOut function to only sleep/delay for one second, performing any such functions in the URL sample is accelerated. The facilitates a faster execution of any such function in the URL sample, which allows for less time to be allocated for dynamic malware analysis of the URL sample and also ensures that all dynamic content (e.g., all such functions are executed) can be analyzed within such allocated period of time.

In one embodiment, dynamic time allocator 330 sets a SetTimeOut timer to a maximum of 10 seconds (e.g., or some other value can be used for this SetTimeOut timer). If the URL sample has a SetTimeOut function, then dynamic time allocator 330 can apply the SetTimeOut timer as a maximum period of time allocated for the dynamic malware analysis of the URL sample in the instrumented VM environment (e.g., other timers may also be applied (in parallel), as further described below). As an example use case scenario, if the SetTimeOut timer is set to a maximum of 10 seconds for a given URL sample (e.g., the URL sample includes a SetTimeOut function), then the allocated timer for the dynamic analysis of the URL sample dynamically allocates 10 seconds for the dynamic malware analysis of the URL sample in this example. Thus, this technique allows for a more efficient use of computing resources of the instrumented VM environment by dynamically allocating the amount of time allocated to dynamic malware analysis of certain URL samples. This technique also facilitates enhanced dynamic malware analysis in an efficient period of time by ensuring that a sufficient time period is allocated for the dynamic malware analysis, and the various other techniques described herein also ensure that dynamic content (e.g., various Java Script code) associated with the URL sample is fully executed for analysis as well as further described herein. Additional use case scenarios will be described below.

In an example implementation, event message hooks 316 can hook one or more different types of events that are associated with the URL sample (e.g., included in the enumerated events as described above). For example, a message hook can be registered for an onload finish event such that a message notification is generated for an onload finish event in the Java Script code of the URL sample (e.g., the message notification is sent after the function(s) that is called after the onload event has completed execution, and thus, dynamic execution and rendering of the content of the URL sample has completed). In this example, the message hook provides a message notification when the onload finish event is completed.

In one embodiment, dynamic time allocator 330 sets a timer (e.g., onload timer) to a maximum of 20 seconds (e.g., or some other value can be used for this onload timer). If the URL sample has an onload event, then event message hooks 316 can generate a message hook to generate a message notification when the onload event is finished. As an example use case scenario, if the onload timer is set to a maximum of 20 seconds, and the onload finish event message notification is received at 7 seconds into the 20 second timer, then the allocated timer for the dynamic analysis of the URL sample can be reduced by dynamic time allocator 330 to save 13 seconds in this example. Thus, this technique allows for a more efficient use of computing resources of the instrumented VM environment by dynamically reducing the amount of time allocated to dynamic malware analysis of certain URL samples. This technique also facilitates enhanced dynamic malware analysis in an efficient period of time by ensuring that the static content associated with a given URL sample is fully rendered during the time period allocated for the dynamic malware analysis, and the various other techniques described herein also ensure that dynamic content (e.g., various Java Script code) associated with the URL sample is fully analyzed as well as further described herein. Additional use case scenarios will be described below.

In an example implementation, modify refresh delay 318 can modify a refresh event to reduce the parameter setting for that time before the refresh is executed (e.g., to replace the refresh function parameter from, for example, five minutes of delay to one second to speed up operation). As discussed above, attackers can attempt to include such a delay before executing the refresh in Java Script code as a mechanism to avoid detection in typical VM emulation techniques, by having the malware code not execute the refresh function (e.g., which can then be used to load the malware associated content) until some period of time that exceeds a typical amount of time allocated to a dynamic malware analysis in a VM environment (e.g., using such as a delayed refresh function to delay execution of certain code thereby effectively delaying malware code execution to not execute until after expiration of, for example, five minutes, assuming that a typical maximum time period allocated for such dynamic malware analysis in a VM environment would not be longer than five minutes).

In one embodiment, a refresh event is determined to be associated with a given URL sample (e.g., included in the enumerated events as described above), and then the time parameter associated with the refresh function (e.g., the parameter that specifies the period of time that is used to trigger the refresh event) can be modified by rewriting the parameter for that refresh event in memory using a patch memory technique (e.g., to rewrite that parameter value to equal to one second, or some other time value, such that the refresh event can be triggered and completed within an allocated period of time for dynamic malware analysis, such as a 20 second timer window or some other timer value). Thus, this technique allows for a more efficient use of computing resources of the instrumented VM environment by dynamically allocating the amount of time allocated to dynamic malware analysis of certain URL samples. This technique also facilitates enhanced dynamic malware analysis in an efficient period of time by ensuring that a sufficient time period is allocated for the dynamic malware analysis, and the various other techniques described herein also ensure that dynamic content (e.g., various Java Script code) associated with the URL sample is fully analyzed as well as further described herein. Additional use case scenarios will be described below.

In an example implementation, user interface (UI) event triggers 320 can hook one or more different types of events that are associated with the URL sample (e.g., included in the enumerated events as described above). For example, one or more functions in Java Script code associated with the URL sample that are triggered in response to one or more UI events can be directly called to be executed without delay to facilitate an enhanced dynamic malware analysis of the URL sample in an efficient period of time. Example UI events include OnClick, OnMouseMove, OnKeyDown, OnKeyUp, and/or various other UI events. This technique facilitates detection of malware executed after such UI events that would otherwise not be detected in a typical VM environment. In some cases, all permutations of functions associated with such UI events can be executed during the malware analysis of the URL sample in the instrumented VM environment. In one embodiment, such functions can be called for execution prior to initiating a timer selected by the dynamic time allocator for the malware analysis of the URL sample in the instrumented VM environment (e.g., this approach ensures that all such event triggered functions are executed during the period of time allocated for the dynamic malware analysis such as the above-described 20 second timer, such as prior to the above-described other techniques to ensure everything is triggered in the dynamic content associated with the URL during this dynamic malware analysis to observe rendered URL behavior in the browser executed in the instrumented VM environment).

In one embodiment, UI event triggers 320 handles a variety of UI events that can be configured in Java Script code associated with a URL sample. For example, a window.alert function pops up a message box that typically needs to be closed to allow the browser to proceed with rendering the URL sample (e.g., similarly applies to the window.confirm function). Below is example pseudo code that is provided for these functions.

Window.Alert=function ( ){ } // so "alert" does nothing
Window.Confirm=function ( ) {return OK}; // so "confirm" function returns okay As another example UI event trigger, a window.close function closes the browser, which is typically undesirable for purposes of performing a dynamic malware analysis using the browser in the instrumented VM environment. As such, below is example pseudo code that is provided for these functions.

Window.Close=function ( ){ } // so "close" does nothing

Various other UI events can be processed and recorded for similarly facilitating an efficient and enhanced dynamic malware analysis of URLs using a browser in the instrumented VM environment. An example of such other UI events includes the following: onabort, onactivate, onafterupdate, onbeforeactivate, onbeforecopy, onbeforecut, onbeforedeactivate, onbeforeeditfocus, onbeforepaste, onbeforeupdate, onblur, oncellchange, onclick, oncontextmenu, oncontrolselect, oncopy, oncut, ondataavailable, ondatasetchanged, ondatasetcomplete, ondblclick, ondeactivate, ondragstart, onerror, onerrorupdate, onfilterchange, onfocus, onfocusin, onfocusout, onhelp, onkeydown, onkeypress, onkeyup, onlayoutcomplete, onload (e.g., such as described above using event message hooks component 316), onlosecapture, onmousedown, onmousemove, onmouseout, onmouseover, onmouseup, onmousewheel, onmove, onmoveend, onmovestart, onmscontentzoom, onmssitemodejumplistitemremoved, onmsthumbnailclick, onpagehide, onpageshow, onpaste, onprogress, onpropertychange, onreadystatechange, onresize, onresizeend, onresizestart, onrowenter, onrowexit, onrowsdelete, onrowsinserted, onscroll, onselect, onselectionchange, onselectstart, onstop, onstoragecommit, ontimeout, and/or onunload.

These techniques will now be further illustrated with respect to various use case scenarios of different URL samples.

Example Use Case Scenarios for Different URL Samples

In one embodiment, each of the above-described features implemented using modify time-out delay component 314, event message hooks 316, modify refresh delay 318, and UI event triggers 320, are executed (e.g., in parallel) for each URL sample for performing a dynamic malware analysis of the URL sample using a browser executed in the instrumented VM environment. As further described below with respect to various use case scenarios, dynamic time allocator 330 can select one or more timers for dynamically determining a period of time allocated for the dynamic malware sample of a given URL sample based on content associated with the URL sample. These techniques facilitate an enhanced and efficient dynamic malware analysis of the URL sample using a browser executed in the instrumented VM environment.

As a first use case scenario, assume that a URL sample (URL A) is associated with the below content (e.g., HTML and/or Java Script code, etc.).
<html>
<js> // note that there is no timeout function in this example Java Script code
</html>

In this example use case scenario, there is no timeout function in the Java Script code. The dynamic time allocator (e.g., dynamic time allocator 330) can determine to terminate the time period for the dynamic analysis of URL A after the rendering of the URL A is completed, which can be detected as the browser will send an event out (e.g., in Microsoft Internet Explorer®, it is the OnDocumentComplete event), which indicates that the rendering of the URL A is completed (e.g., 1 second or the time period required to complete such rendering using the instrumented VM environment, which may vary based on the hardware and software processing capabilities of that instrumented VM environment and complexity of content associated with URL A).

As a second use case scenario, assume that a URL sample (URL B) is associated with the below content (e.g., HTML and/or Java Script code, etc.).
<html>
<js> // note that there is no timeout function in this example Java Script code
<body onload=FuncB( )> // Function B is called when body onload
</html>

In this example use case scenario, there is no timeout function in the Java Script code, but there is an onload event (e.g., Function B is called after the onload event). As similarly discussed above, the event message hooks component (e.g., event message hooks 316 can be used to register the onload event with a message hook) generates a message hook after the onload finish event in the Java Script code of the URL sample (e.g., the function(s) (Function B in this example) that is called after the onload event has completed execution, and thus, dynamic execution and rendering of the content of the URL sample has completed). Assuming that the dynamic time allocator (e.g., dynamic time allocator 330) sets an onload timer of 20 seconds (e.g., or some other value can be used for this onload timer) for analyzing URL B, and assume that the onload finish event message notification is received at 7 seconds into the 20 second timer (e.g., or some other time value that is less than 20 seconds), then the allocated timer for the dynamic analysis of the URL sample can be reduced by the dynamic time allocator to save 13 seconds in this example.

As a third use case scenario, assume that a URL sample (URL C) is associated with the below content (e.g., HTML and/or Java Script code, etc.).
<html>
<js> // a timeout function is included in this example Java Script code
</html>

In this example use case scenario, assume that there is a timeout function included in the Java Script code. As similarly discussed above, the Modify Time-Out Delay component (e.g., Modify Time-Out Delay component 314) can automatically change the parameter for the delay of the SetTimeOut function in the Java Script code of URL C to, for example, one second (e.g., or some other value less than the time allocated (SetTimeOut timer) for dynamic malware analysis of the URL sample). As also similarly described above, the dynamic time allocator (e.g., dynamic time allocator 330) can set a SetTimeOut timer to a maximum of 10 seconds (e.g., or some other value can be used for this SetTimeOut timer), and the dynamic time allocator can apply the SetTimeOut timer (e.g., 10 seconds in this example) as a maximum period of time allocated for the dynamic malware analysis of URL C in the instrumented VM environment.

As a fourth use case scenario, assume that a URL sample (URL D) is associated with the below content (e.g., HTML and/or Java Script code, etc.).
<html>
<js> // a timeout function is included in this example Java Script code
<body onload=FuncB( )> // Function B is called when body onload
</html>

In this example use case scenario, assume that there is a timeout function included in the Java Script code, and there is also an onload event (e.g., Function B is called after the onload event). In this case, the dynamic time allocator (e.g., dynamic time allocator 330) can set two different timers (e.g., that are executed in parallel, such as described below). First, an onload timer can be set to 20 seconds (e.g., or some other value can be used for this onload timer). Second, a SetTimeOut timer can be set to a maximum of 10 seconds (e.g., or some other value can be used for this SetTimeOut timer, a value that, as described above, exceeds the time value that is replaced for the SetTimeOut function by Modify Time-Out Delay component 314, which can be, for example, one second). If the onload finish event is received after expiration of the SetTimeOut timer (e.g., after 10 seconds have expired) and prior to expiration of the onload timer (e.g., before 20 seconds have expired), then the dynamic time allocator (e.g., dynamic time allocator 330) can terminate the time period allocated for the dynamic malware analysis of URL D in this case (e.g., if the onload finish event message was received at 12 seconds, then 8 seconds would be reduced from the time allocated for dynamic malware analysis of URL D). If the onload finish event is received prior to expiration of the SetTimeOut timer (e.g., before 10 seconds have expired), then the dynamic time allocator (e.g., dynamic time allocator 330) applies the SetTimeOut timer for the time period allocated for the dynamic malware analysis of URL D in this case (e.g., if the onload finish event message was received at 4 seconds, then 6 seconds would still remain for the time allocated for dynamic malware analysis of URL D). Thus, in this use case scenario, the longer of the SetTimeOut timer and the onload timer (e.g., which is 20 seconds or when the onload finish event message is received if such is received at a time less than 20 seconds) is applied for dynamically determining the period of time allocated for analysis of URL D using a browser executed in the instrumented VM environment.

As a fifth use case scenario, assume that a URL sample (URL E) is associated with the below content (e.g., HTML and/or Java Script code, etc.).

<html>
<meta refresh: "25; URL P">// Modify refresh delay set to refresh after 25 seconds
<js> // a timeout function is included in this example Java Script code
<body onload=FuncB( )> // Function B is called when body onload
</html>

In this example use case scenario, assume that there is a timeout function included in the Java Script code, an onload event (e.g., Function B is called after the onload event), as well as a refresh event. In this case, the refresh event (e.g., meta refresh event that is set to cause a web page refresh after 25 seconds) would cause a refresh after expiration of the time allocated to performing dynamic malware analysis of URL E, assuming the timer values are set to values as similarly described above with respect to the fourth use case scenario. As described above, the Modify Refresh Delay component (e.g., Modify Refresh Delay component 318) can automatically replace the time value for this refresh delay event equal to, for example, one second. In an example implementation, a third timer (e.g., a refresh timer) can be set to equal to a value of 20 seconds (e.g., or some other value can be used for this refresh timer, such as setting the refresh time to a value of 10 seconds as similarly used for the SetTimeOut timer). As a result, the content that is associated with URL P after the refresh event can be analyzed within the timer values that can be set to values as similarly described above with respect to the fourth use case scenario, and this use case scenario for URL E similarly reduces to the above-described time allocation with respect to the fourth use case scenario for URL D.

Various other use case scenarios can include different permutations of these events, including, for example, various UI events or other events. For example, as similarly described above, if one or more UI events are associated with a URL sample, then the UI event triggers component (e.g., UI event triggers 320) can call the functions associated with such UI events to facilitate an enhanced dynamic malware detection of the URL sample within the period of time allocated for performing the dynamic malware analysis of the URL sample using the browser in the instrumented VM environment (e.g., using dynamic time allocator 330, such as described above with respect to various embodiments and use case scenarios).

Example Processes for Performing an Efficient and Accurate Dynamic Malware Analysis of a URL Using a Browser Executed in an Instrumented Virtual Machine Environment A variety of techniques for performing an efficient and accurate dynamic malware analysis of a URL using a browser executed in an instrumented virtual machine (VM) environment will now be described in conjunction with FIGS. 4 and 5.

FIG. 4 is a flow diagram of a process for performing dynamic malware analysis of a URL using a browser executed in an instrumented virtual machine environment in accordance with some embodiments. In various embodiments, process 400 is performed by malware analysis system 132 and/or cloud security service 122. The process begins at 402 when a URL sample is received. For example, a URL sample can be received by data appliance 102 from system 120. As another example, data appliance 102 can be configured to transmit the URL sample to cloud security service 122 for analysis.

At 404, instantiating a first virtual machine in the instrumented VM environment is performed.

At 406, monitoring the instrumented VM environment while rendering the URL sample using a browser executed in the first VM instance is performed. As an example, the URL sample can be rendered using a browser executed in one or more virtual machines 114-116 and any behaviors logged for analysis by system 132. As another example, the URL sample can be rendered using a browser executed in one or more virtual machines 126-128 and analyzed by cloud security service 122.

At 408, dynamically determining a period of time allocated for performing the dynamic malware analysis of the URL sample using the browser executed in the instrumented VM environment is performed. For example, dynamically determining a period of time allocated for performing the dynamic malware analysis of the URL sample can be performed prior to and/or during the rendering of the URL sample using the browser executed in the instrumented VM environment as described above with respect to FIG. 3.

At 410, a determination is made as to whether the URL sample is malware (e.g., by detecting whether the URL sample is performing malicious behavior or activity in the instrumented virtual environment). For example, data resulting from rendering the URL sample using a browser executed in a virtual machine instance is captured, as similarly discussed above. In one embodiment, the VM environment is instrumented, and a log of network activities (e.g., and/or other activities can be monitored and logged) to capture behaviors of the URL sample monitored during execution (e.g., rendering and execution) in the instrumented VM environment during the allocated period of time, such as described above. As such, the log of network activities (e.g., and/or other logs) can be analyzed after the allocated period of time to determine whether the URL sample is associated with malware (e.g., whether the URL sample can be determined to a malware URL). For example, heap memory process layout and digest is an example of data that can be logged and analyzed for URL malware detection after the URL sample has been executed in the VM environment for the allocated period of time. As another example, a JavaScript de-obfuscated code examination log can be captured and analyzed for URL malware detection after the URL sample has been executed in the VM environment for the allocated period of time. As also explained above, conclusions can be made as to whether the samples are malicious, and signatures can be generated for future use. The virtual machine instance is then available to evaluate new URL samples using the techniques disclosed herein.

For example, if a determination is made that the URL sample is malware (e.g., a malware URL), then an output can be generated that indicates that the URL sample is malware (e.g., based at least in part on a determination that the URL sample is associated with malicious behavior(s) and/or links to a known malware URL(s), etc.). As one example, a signature for the attachment can also be generated (e.g., as an MD5 hash-based signature). As another example, instead of or in addition to generating a signature, an alert can be generated that instructs data appliance 102 not to provide the requested URL to client 104.

FIG. 5 is another flow diagram of a process for performing dynamic malware analysis of a URL using a browser executed in an instrumented virtual machine environment in accordance with some embodiments. In various embodiments, process 500 is performed by malware analysis system 132 and/or cloud security service 122, which has received a URL sample for performing dynamic malware analysis using a browser executed in an instrumented VM environment.

At 502, enumerating events associated with a URL sample is performed. For example, event enumerator component 312 can enumerate events associated with the URL sample as similarly described above with respect to FIG. 3.

At 504, modifying a timeout delay associated with the URL sample (e.g., if such a timeout delay is present) is performed. For example, modify time-out delay component 314 can modify a timeout delay associated with the URL sample as similarly described above with respect to FIG. 3 (e.g., modifying a delay for a SetTimeOut function in Java Script code associated with the URL sample to be only one second or some other value).

At 506, modifying a refresh delay associated with the URL sample (e.g., if such a refresh delay is present) is performed. For example, modify refresh delay component 318 can modify a refresh delay associated with the URL sample as similarly described above with respect to FIG. 3 (e.g., modifying a delay for a refresh event associated with the URL sample to be only one second or some other value).

At 508, calling/executing a function(s) associated with a user interface (UI) event trigger (e.g., if such a UI event is present) is performed. For example, UI event triggers component 320 can directly call a function(s) associated with a UI event trigger associated with the URL sample as similarly described above with respect to FIG. 3 (e.g., a UI event in the Java Script code of the URL sample, such as OnClick, OnMouseMove, OnKeyDown, OnKeyUp, and/or various other UI events). As another example, UI event triggers component 320 can simulate a UI event to cause the browser to execute a function(s) associated with a UI event trigger associated with the URL sample as similarly described above with respect to FIG. 3.

At 510, generating a message notification for an event associated with the URL sample (e.g., if such an event is present) is performed. For example, event message hooks component 316 can generate a message notification for an event associated with the URL sample (e.g., an onload finish event message notification for an onload event in the Java Script code of the URL sample) as similarly described above with respect to FIG. 3.

Accordingly, as described above with respect to various embodiments and use case scenarios, these techniques can be performed in conjunction with the dynamic time allocator to facilitate an efficient and accurate dynamic malware analysis of various URL samples using a browser executed in an instrumented VM environment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing dynamic malware analysis of Uniform Resource Locator (URL) samples using a browser executed in an instrumented virtual machine environment, comprising:
    the instrumented virtual machine environment executed on a processor that receives a URL sample for dynamic malware analysis using the browser executed in the instrumented virtual machine environment; and
    a dynamic time allocator executed on the processor that dynamically determines a period of time allocated for performing the dynamic malware analysis of the URL sample using the browser executed in the instrumented virtual machine environment, wherein the URL sample is rendered using the browser executed in the instrumented virtual machine environment and monitored using the instrumented virtual machine environment for the period of time allocated for performing the dynamic malware analysis of the URL sample, wherein the determining of the period of time allocated for performing the dynamic malware analysis of the URL sample using the browser executed in the instrumented virtual machine environment comprises:
        reducing a time-out delay of the URL sample to be shorter;
        modifying a refresh delay of the URL sample to be shorter; and
        triggering execution of content of the URL sample.

2. The system recited in claim 1, wherein the URL sample is rendered using the browser executed in the instrumented virtual machine environment and monitored using the instrumented virtual machine environment for at least the period of time allocated for performing the dynamic malware analysis of the URL sample or until malicious behavior is detected.

3. The system recited in claim 1, wherein the URL sample includes a URL that includes a reference to a resource that can be retrieved and rendered using the browser executed in the instrumented virtual machine environment.

4. The system recited in claim 1, wherein the URL sample includes a URL that includes a reference to a resource that can be retrieved and rendered using the browser executed in the instrumented virtual machine environment, and wherein the resource includes dynamic content.

5. The system recited in claim 1, wherein the URL sample includes a URL that includes a reference to a resource that can be retrieved and rendered using the browser executed in the instrumented virtual machine environment, and wherein the resource includes executable content that includes Java Script code.

6. The system recited in claim 1, wherein the URL sample includes a URL that includes a reference to a resource that can be retrieved and rendered using the browser executed in the instrumented virtual machine environment, and wherein the dynamic time allocator executed on the processor that dynamically determines the period of time allocated for malware analysis of the URL sample further includes reducing the period of time allocated for malware analysis of the URL sample based on executable content associated with the resource.

7. The system recited in claim 1, wherein the URL sample includes a URL that includes a reference to a resource that can be retrieved and rendered using the browser executed in the instrumented virtual machine environment, and wherein the dynamic time allocator executed on the processor that dynamically determines the period of time allocated for malware analysis of the URL sample further includes extending the period of time allocated for malware analysis of the URL sample based on executable content associated with the resource.

8. The system recited in claim 1, further comprising:
a URL malware analysis that determines whether the URL sample is associated with malware based on analysis of the URL sample during the period of time allocated for performing the dynamic malware analysis of the URL sample using the browser executed in the instrumented virtual machine environment.

9. The system recited in claim 1, further comprising:
a browser helper object (BHO) that is loaded by the browser prior to rendering the URL sample.

10. The system recited in claim 1, wherein the instrumented virtual machine environment is executed by a cloud security service, wherein the instrumented virtual machine environment executed on the processor that receives the URL sample for malware analysis further includes receiving the URL sample at the cloud security service from a security device, and wherein the URL sample is rendered using the browser executed in the instrumented virtual machine environment and monitored using the instrumented virtual machine environment for at least the period of time allocated for malware analysis of the URL sample or until malicious behavior is detected.

11. A method for performing dynamic malware analysis of Uniform Resource Locator (URL) samples using a browser executed in an instrumented virtual machine environment, comprising:
receiving a URL sample for dynamic malware analysis using the browser executed in the instrumented virtual machine environment executed on a processor; and
dynamically determining a period of time allocated for performing the dynamic malware analysis of the URL sample using the browser executed in the instrumented virtual machine environment, wherein the URL sample is rendered using the browser executed in the instrumented virtual machine environment and monitored using the instrumented virtual machine environment for the period of time allocated for performing the dynamic malware analysis of the URL sample, wherein the determining of the period of time allocated for performing the dynamic malware analysis of the URL sample using the browser executed in the instrumented virtual machine environment comprises:
reducing a time-out delay of the URL sample to be shorter;
modifying a refresh delay of the URL sample to be shorter; and
triggering execution of content of the URL sample.

12. The method of claim 11, wherein the URL sample is rendered using the browser executed in the instrumented virtual machine environment and monitored using the instrumented virtual machine environment for at least the period of time allocated for performing the dynamic malware analysis of the URL sample or until malicious behavior is detected.

13. The method of claim 11, wherein the URL sample includes a URL that includes a reference to a resource that can be retrieved and rendered using the browser executed in the instrumented virtual machine environment.

14. The method of claim 11, wherein the URL sample includes a URL that includes a reference to a resource that can be retrieved and rendered using the browser executed in the instrumented virtual machine environment, and wherein dynamically determining the period of time allocated for malware analysis of the URL sample further includes reducing the period of time allocated for malware analysis of the URL sample based on executable content associated with the resource.

15. The method of claim 11, wherein the instrumented virtual machine environment is executed by a cloud security service, wherein the instrumented virtual machine environment executed on the processor that receives the URL sample for malware analysis further includes receiving the URL sample at the cloud security service from a security device, and wherein the URL sample is rendered using the browser executed in the instrumented virtual machine environment and monitored using the instrumented virtual machine environment for at least the period of time allocated for malware analysis of the URL sample or until malicious behavior is detected.

16. A computer program product for performing dynamic malware analysis of Uniform Resource Locator (URL) samples using a browser executed in an instrumented virtual machine environment, the computer program product being embodied in a non-transitory, tangible computer readable storage medium and comprising computer instructions for:
receiving a URL sample for dynamic malware analysis using the browser executed in the instrumented virtual machine environment executed on a processor; and
dynamically determining a period of time allocated for performing the dynamic malware analysis of the URL sample using the browser executed in the instrumented virtual machine environment, wherein the URL sample is rendered using the browser executed in the instrumented virtual machine environment and monitored using the instrumented virtual machine environment for the period of time allocated for performing the dynamic malware analysis of the URL sample, wherein the determining of the period of time allocated for performing the dynamic malware analysis of the URL sample using the browser executed in the instrumented virtual machine environment comprises:
reducing a time-out delay of the URL sample to be shorter;
modifying a refresh delay of the URL sample to be shorter; and
triggering execution of content of the URL sample.

17. The computer program product recited in claim 16, wherein the URL sample is rendered using the browser executed in the instrumented virtual machine environment and monitored using the instrumented virtual machine environment for at least the period of time allocated for performing the dynamic malware analysis of the URL sample or until malicious behavior is detected.

18. The computer program product recited in claim 16, wherein the URL sample includes a URL that includes a reference to a resource that can be retrieved and rendered using the browser executed in the instrumented virtual machine environment.

19. The computer program product recited in claim 16, wherein the URL sample includes a URL that includes a reference to a resource that can be retrieved and rendered using the browser executed in the instrumented virtual machine environment, and wherein dynamically determining the period of time allocated for malware analysis of the URL sample further includes reducing the period of time allocated for malware analysis of the URL sample based on executable content associated with the resource.

20. The computer program product recited in claim 16, wherein the instrumented virtual machine environment is executed by a cloud security service, wherein the instrumented virtual machine environment executed on the processor that receives the URL sample for malware analysis further includes receiving the URL sample at the cloud security service from a security device, and wherein the URL sample is rendered using the browser executed in the instrumented virtual machine environment and monitored using the instrumented virtual machine environment for at least the period of time allocated for malware analysis of the URL sample or until malicious behavior is detected.

\* \* \* \* \*